United States Patent
Gartlan

[15] 3,658,459
[45] Apr. 25, 1972

[54] ABSORBENT FOR PURIFYING DRY-CLEANING SOLVENTS
[72] Inventor: John A. Gartlan, Glen Mills, Pa.
[73] Assignee: Pursol Chemical Corp., Philadelphia, Pa.
[22] Filed: Mar. 6, 1968
[21] Appl. No.: 710,735

[52] U.S. Cl. .............................. 8/142, 252/163, 252/259.5
[51] Int. Cl. ........................................................ D06l 1/00
[58] Field of Search .......................... 8/142; 252/163, 259.5

[56] References Cited

UNITED STATES PATENTS

| | | | |
|---|---|---|---|
| 1,669,235 | 5/1928 | Fenton | 252/89 DC |
| 2,315,410 | 3/1943 | Simons et al. | 8/142 X |
| 2,390,490 | 1/1945 | Atwell | 8/142 X |
| 3,360,474 | 12/1967 | Cooley et al. | 252/259.5 |

OTHER PUBLICATIONS

" Attapulgite, Its Properties & Applications" Ind. & Eng. Chem., Vol. 59, No. 9, Sept. 1967 (pp. 59–69)

Primary Examiner—Mayer Weinblatt
Attorney—McClure & Weiser

[57] ABSTRACT

A solvent-permeable fibrous container containing attapulgite for use in dry-cleaning operations to remove objectionable color and odor and other materials from the cleaning solvent. A process for cleaning such solvents by the use of attapulgite. A special type of attapulgite sorptive clay is of particular value in this process.

8 Claims, No Drawings

ABSORBENT FOR PURIFYING DRY-CLEANING SOLVENTS

This invention relates to dry-cleaning of garments, fabrics and other similar articles. More particularly, this invention relates to the continuous removal of grease, wax, fats, oils, dyes, stains, dirt, grime, and other objectionable color and odor materials and the like from dry-cleaning solvent during the dry-cleaning process. The invention also relates to a special attapulgite that is remarkably well-suited for the process of purifying cleaning solvents.

Grease, wax, fats, oils, stains, dirt, grime and the like which are present in soiled garments and fabrics are of two types, namely, those that are soluble in dry-cleaning solvent and those that are insoluble. During the dry-cleaning process, the insoluble components become suspended in the dry-cleaning solvent and are removed from the solvent by filtration. The soluble components are dissolved in the dry-cleaning solvent.

During the process of dry-cleaning, grease, wax, fats, oils, stains, dirt, grime and the like are dissolved from garments and fabrics and the solvent soon becomes spent and saturated with these components. When this occurs, the solvent loses its ability to further remove soluble soils from other garments and also may impart undesirable odors and colors thereto.

In past practices, these soluble contaminants have been removed chiefly by passing the spent solvent through a mass or bed of activated carbon which adsorbs the contaminants. There are, however, several major disadvantages in the use of activated carbon as adsorbent to remove dissolved contaminants from dry-cleaning solvent. First, in addition to adsorbing the contaminants from the dry-cleaning solvent, activated carbon also tends to absorb dry-cleaning soaps, detergents and other aids added to dry-cleaning solvent. And, when the activated carbon becomes moistened with traces of water, it tends to clog the filters, thus preventing filtration of the solvent during the dry-cleaning process.

The problems and difficulties encountered by workers skilled in the art is illustrated, for instance, in U.S. Pat. No. 3,203,754 to Young et al. This patent proposes a method for clarifying dry-cleaning solvents using granular carbon of a specific type. In U.S. Pat. No. 3,231,324 discoloring ingredients from a dry-cleaning solution are removed by the use of a sweetener, such as oxides, hydrated oxides, and silicates of magnesium, calcium, aluminum, and mixtures thereof. In U.S. Pat. No. 3,309,166, the dry-cleaning solvent liquid for dry-cleaning fabrics, garments, and the like are treated with a mixture of activated carbon and activated clay. In U.S. Pat. No. 2,150,031, the dry-cleaning bath is treated with bentonite to dehydrate the organic solvent. It is apparent from the prior art that no ideal material has yet been discovered which fulfills the requirements for a modern dry-cleaning process.

All the above-referred to U.S. Patents are incorporated herein by reference, as well as the article entitled "Attapulgite, Its Properties and Applications," *Ind. & Eng. Chem.*, Vol. 59, No. 9, Sept. 1967, pp. 59–70.

Accordingly, it is an object of this invention to provide a new and improved adsorbent for use in dry-cleaning processes for the removal from dry-cleaning solvent of soluble components such as grease, wax, fats, oils, stains, dyes, grime, and the like.

Another object of this invention is to provide a dry-cleaning process employing the new and improved adsorbent of this invention which increases the effectiveness of the dry-cleaning solvent and eliminates the need for frequent distillation.

Still another object is to provide a dry-cleaning process in which the adsorbent is contained in a solvent-permeable fibrous container or bag which is present in the solvent in the dry-cleaning apparatus during the dry-cleaning process.

These and other objects of this invention will become apparent from the accompanying disclosure and claims.

In accordance with this invention, it has now been discovered that attapulgite, a particular type of sorptive clay is ideally suited for removing the undesirable components of organic solvents used in dry-cleaning processes. More particularly, it has been found that a special type of high heat activated attapulgus clay low in volatile matter is particularly well-suited for use in the process of the present invention. A highly preferred specific type of attapulgus clay which is unexpectedly superior to other clay products (even other attapulgus clay products) for use in the process of the invention has the following specifications:

TABLE I

Specification

| | | |
|---|---|---|
| Particle size | 16/30 | U.S. sieve number |
| Bulking value | 20.60 | Lb. per gal. |
| Bulking value | 0.0486 | Gal. per lb. |
| pH Range | 7.5–9.5 | |
| Specific gravity | 2.5 | |
| Bulk density | 28–36 | Tamped Volume Wt. (lb./cu.ft.) Moisture-free basis |
| B.E.T. ($m^2/gm$) | 125 | Moisture-free basis |
| Surface area | | |
| Volatile Matter | 5 | % Wt. Loss 1,200°F. Moisture-free basis |
| Ignition Loss | 6 | Wt. % Loss 1,800°F., as produced |

The attapulgus clay used in accordance with this invention generally has the following chemical analysis:

TABLE II

Typical Chemical Analysis of Attapulgus Clay Products
(Volatile-Free Basis)

| | |
|---|---|
| Silicon ($SiO_2$) | 68.0% |
| Aluminum ($Al_2O_3$) | 12.0% |
| Magnesium (MgO) | 10.5% |
| Iron ($Fe_2O_3$) | 5.0% |
| Calcium (CaO) | 1.7% |
| Phosphorus ($P_2O_5$) | 1.0% |
| Potassium ($K_2O$) | 1.0% |
| Titanium ($TiO_2$) | 0.7% |
| Trace Elements | 0.1% |

Attapulgite, and more particularly the specific attapulgite type preferred, results in a most highly efficient process for cleaning dry-cleaning solvents of soluble components in a dry-cleaning process. In accordance with this invention, there is also provided a solvent-permeable container of a sack type for positioning the attapulgite in a stated and non-dispersed condition within the container holding the cleaning solvent, preferably at the bottom thereof. In accordance with the invention, large amounts of soiled garments can be processed with the cleaning solvent when there is used the attapulgite solvent-permeable sack provided in accordance with the invention.

Attapulgite has high surface area and high sorptivity. It readily adsorbs water, alcohols, acids, aldehydes, ketones, n-olefins, natural esters, aromatics, paraffins and cycloparaffins. Because of its relatively large pores, attapulgite is a particularly strong adsorbent for high molecular weight compounds especially dyes and coloring materials. Attapulgite is inert to most chemicals. For example, attapulgite is relatively unaffected by electrolytes, such as sodium chloride, ammonia, sodium hydroxide, potassium chloride and inorganic phosphates. Thus, soaps, detergents and other aids added to dry-cleaning solvents are not removed by attapulgite. Because of this high chemical inertness, attapulgite is not attacked by most common solvents. Consequently, attapulgite is inert to common dry-cleaning solvents such as petroleum base hydrocarbons, e.g., stoddard solvents and halogenated hydrocarbons, e.g., carbon tetrachloride, trichloroethylene, perchloro-ethylene, etc.

In accordance with the invention, it has been found that when attapulgite is used as adsorbent in dry-cleaning operations, it removes from the solvent the objectionable amount of greases, wax, fats, and oils, such as fatty acids, esters, etc. Further, it prevents excess moisture build-up, removes odors, dyes and colors from the dry-cleaning solvent and eliminates solvent swales on garments. In addition, attapulgite eliminates the need for costly and bothersome distillation, thereby avoiding operation interruption. Attapulgite has further advantages described below.

The objects of this invention are accomplished by bringing contaminated dry-cleaning solvent into contact with attapulgite in such a manner that the contaminents are adsorbed from the solvent by the attapulgite.

In one embodiment of this invention attapulgite, packed in a solvent-permeable bag with suitable means to handle the bag like an attached draw cord, is placed and allowed to remain in the dry-cleaning tank or in the lint trap. The end of the draw cord may be left outside the tank to facilitate easy removal of the bag. During the dry-cleaning process, the solvent dissolves the soluble components such as grease, stains, wax, fats, oils and the like from the soiled garments and fabrics. As this cleaning operation continues, this contaminated solvent subsequently comes in contact with and passes through the solvent-permeable bag of attapulgite. Essentially all of the contaminants dissolved in the solvent are removed and and purified solvent when recirculated is ready to dissolve additional soluble components from other soil garments and fabrics.

Although attapulgite can be employed at various levels, we have found that the average size of dry-cleaning apparatus is a four to six pound bag. We have found that one five pound bag of attapulgite can effectively remove from dry-cleaning solvent all the dissolved grease, color, fats, stains, oils, grime, dirt and the like from about 400 pounds of soiled garments. After about 400 pounds of soiled garments have been cleaned, the spent bag of attapulgite is easily replaced by a new one simply by lifting the spent bag out of the tank by the draw cord.

The solvent-pervious bag or sack type container which contains the attapulgite may be made of cellulosic fibrous material (cotton, muslin, burlap) or synthetic fibrous materials, like nylon, or fine mesh metallic container. These materials are chemically inert to conventional dry-cleaning solvents such as petroleum-base hydrocarbon, e.g., stoddard solvents and halogenated hydrocarbons, e.g., carbon tetrachloride, trichloroethylene, perchloroethylene, etc.

Attapulgite is an ideal material for use in the dry-cleaning process because its action appears to be selective, i.e., it does not promote the removal of materials from the soiled fabrics which should be retained thereon; particularly noteworthy is that the use of attapulgite has no adverse effects on synthetic fibers. Indeed, attapulgite, when used in accordance with the invention, does not promote the removal of the synthetic resin sizing now commonly used on synthetic fibers, such as the polyamides, polyesters, or polyethylenically unsaturated fibers, like polyethylene, polypropylene, or acrylic fibers. Also, attapulgite seems perfectly well-suited for use with non-synthetic fibrous materials like cotton and wool. This versatility is unexpected since it could have been expected that its effectiveness on synthetic fibers would not carry over to non-synthetics, or that the selectivity of attapulgite with respect to the materials it adsorbs from the solvent would extend to the nature of the materials that can be treated with the attapulgite.

The relationship of 5 pounds of attapulgite for about 400 pounds of soiled garments cleaning is a measure of the remarkable effectiveness of the attapulgite. Small or larger amounts, such as 1 to 10 pound bags may be used, but the present size lends itself particularly well for 12 hour operation cycles. The bags of attapulgite can be agitated or moved inside the solvent cleaning tank, but even better results and more efficient operations ensue by allowing the bag to remain static in the solvent.

In accordance with the invention, it is most preferable to use attapulgite exclusively of other conventional adsorbents. Yet it is contemplated that attapulgite be used, if desired, with traditional materials, in admixture with the attapulgite or in separate containers in the solvent cleaning tank. Generally, if all the benefits of the use of attapulgite are desired to be retained, attapulgite should be used in amounts of at least about 50 percent, preferably over about 85 percent or 90 percent by weight of any mixture.

Further, in a further development of the invention, it has been discovered that attapulgite in mixture with bauxite is remarkably well-suited for use in dry-cleaning solvents. A mixture of about 50 percent to 75 percent by weight of attapulgite to bauxite appears to be a highly effective material.

When the special dry-cleaning solvent, attapulgite, of this invention is employed in a dry-cleaning operation, it has been observed that the cleaned garments exhibit a soft sheen, are cleaner with no trace of musty odors, and have retained their body and fullness as may have been imparted by synthetic sizing. Also, the colors of the cleaned garments are brighter and more sharply defined, the garments are softer in texture and have a pleasant feel.

The use of the attapulgite permits reduced use of dry-cleaning soaps or detergents. Another advantage of the attapulgite is that it appears not to increase and even to minimize the tendency of static electricity build-up which is common and objectionable with many synthetic fibers.

In accordance with the invention, the attapulgite clay is used in a cleaning process with various solvents well-known in the dry-cleaning field, such as low flash hydrocarbon or petroleum solvents, such as VMP naphtha, stoddard solvent, also the halogenated hydrocarbons, such as halogenated $C_1$ and $C_2$ hydrocarbons, e.g. carbon tetrachloride, trichloroethylene, perchloroethylene and chlorofluoroethylene.

I claim:

1. In a method for removing objectionable color and odor bodies from a contaminated organic cleaning solvent used in dry-cleaning processes, the improvement which comprises continuously flowing said solvent through attapulgite maintained in a static, non-dispersed condition, said attapulgite having as its main components oxides of silicon, aluminum and magnesium and being high heat activated and low in volatile matter.

2. The process of claim 1 in which the attapulgite has the following specification: a 16/30 (U.S. sieve number) particle size, and low volatile matter content.

3. The process of claim 1 in which the attapulgite is in a solvent-permeable container.

4. The process of claim 3 in which the container is a sack, and which comprises placing the sack into the solvent after about 400 pounds of soiled garments have been treated with said solvent.

5. The process of claim 4 in which the sack is removed from the solvent and another sack containing fresh attapulgite is placed in the solvent after about 400 pounds of soiled garments have been treated with said solvent.

6. The process of claim 4 in which the sack contains about 4 to 6 pounds of attapulgite.

7. The process of claim 6 in which the solvent is perchloroethylene.

8. In combination, dry-cleaning tank and a solvent-permeable sack containing attapulgus clay which has a 16/30 (U.S. sieve number) particle size, a volatile matter content equivalent to 5 percent weight loss at 1,200° F. on a moisture-free basis, said attapulgite having as its main components oxides of silicon, aluminum and magnesium and being high heat activated and low in volatile matter.

* * * * *